United States Patent
Oberstelehn et al.

(10) Patent No.: US 8,060,151 B2
(45) Date of Patent: Nov. 15, 2011

(54) APPARATUS FOR POSITION-DEPENDENT CONTROL

(75) Inventors: Rolf Oberstelehn, Bocholt (DE); Stefan Thewes, Bocholt (DE)

(73) Assignee: Gigaset Communications GmbH, Munich (DE)

( * ) Notice: Subject to any disclaimer, the term of this patent is extended or adjusted under 35 U.S.C. 154(b) by 714 days.

(21) Appl. No.: 12/084,064

(22) PCT Filed: Sep. 7, 2006

(86) PCT No.: PCT/EP2006/008751
§ 371 (c)(1),
(2), (4) Date: Apr. 24, 2008

(87) PCT Pub. No.: WO2008/028510
PCT Pub. Date: Mar. 13, 2008

(65) Prior Publication Data
US 2009/0253468 A1    Oct. 8, 2009

(51) Int. Cl.
*H04B 1/38* (2006.01)

(52) U.S. Cl. ............... 455/570; 455/550.1; 455/343.1; 455/456.3

(58) Field of Classification Search .............. 455/550.1, 455/570, 296, 283, 552.1, 556.1, 569.1, 566, 455/456.1, 456.3, 574, 572, 343.1, 343.2; 379/420.01
See application file for complete search history.

(56) References Cited

U.S. PATENT DOCUMENTS

| | | | |
|---|---|---|---|
| 6,510,326 B1 * | 1/2003 | Martschink et al. | 455/550.1 |
| 2001/0055985 A1 * | 12/2001 | Matt et al. | 455/570 |
| 2005/0201549 A1 * | 9/2005 | Dedieu et al. | 379/420.01 |
| 2007/0037605 A1 * | 2/2007 | Logan | 455/567 |

FOREIGN PATENT DOCUMENTS

| | | |
|---|---|---|
| EP | 1 168 800 A2 | 1/2002 |
| EP | 1 575 250 A1 | 9/2005 |
| WO | WO 00/57616 | 9/2000 |

* cited by examiner

*Primary Examiner* — John J Lee
(74) *Attorney, Agent, or Firm* — Staas & Halsey LLP (57) ABSTRACT

An apparatus for position-dependent control has a control unit, where the control unit takes the position of the apparatus as a basis for: a) controlling damping and/or echo cancellation for the apparatus, and/or b) switching a summit of the apparatus on or off or to a power saving mode, and/or c) prompting call acceptance.

2 Claims, 6 Drawing Sheets

APPARATUS FOR POSITION-DEPENDENT CONTROL

CROSS REFERENCE TO RELATED APPLICATIONS

This application is based on and hereby claims priority to PCT/EP2006/008751 filed on Sep. 7, 2006, the contents of which are hereby incorporated by reference.

BACKGROUND

The invention relates in particular to a mobile telephone having attenuation control, as used in connection with handsfree systems. Telephone terminal devices should maintain a certain decoupling between received and transmitted signal in order to operate properly or to comply with regulatory requirements. In the case of handsfree terminal devices the high levels of amplification required would make it necessary to introduce a very great attenuation/decoupling in order to avoid, for example, feedback, echoes or what is termed reverberation.

This attenuation/decoupling should be implemented for example either by a deviation control unit and/or by way of an acoustic echo canceller and/or by a combination of different decoupling methods. A deviation control unit inserts the necessary attenuation for example alternately in the transmitting or in the receiving direction.

Particularly in the case of mobile handsfree devices, such as e.g. cordless telephones or mobile telephones, the decoupling possible by an acoustic echo compensator is not usually sufficient on its own, however, to get by without an additional deviation control unit and/or further decoupling measures. A problem in this case is that said deviation control unit must be adjusted to the most unfavorable position, e.g. lying on the microphone, in order that the mobile handsfree device will still also operate sufficiently well under these "bad" conditions.

SUMMARY

One potential object is to provide a simply constructed apparatus which enables in particular efficient attenuation control. In particular the attenuation control is intended to allow high voice quality, preferably also a mode of operation which is scarcely different from a full-duplex mode of operation.

The inventors propose an apparatus for controlling attenuation, comprising:
at least one transmission branch for transmitting signals,
either a): an attenuation control unit which controls the attenuation of the signals, and/or b): an echo canceller unit which is coupled to the transmission branch by an input or output.

The control unit controls the attenuation in variant a) and/or the echo cancellation in variant b) as a function of the position of the apparatus.

The first aspect is based inter alia on the following considerations. If the device is operated in a favorable position, e.g. upright, a decoupling is inserted which would possibly not even be necessary for this positioning. As a result of the additional decoupling the duplex communication becomes worse than actually necessary for this position. Similarly to this situation, the transmit and receive frequency responses for example are then also different in the respective positions, e.g. upright or horizontal, and may negatively affect handsfree operation.

For this reason the position of the apparatus is taken into account by the attenuation controller. For example, the position can be transmitted manually to the attenuation control unit, by actuating an input key for example. Preferably, however, the position is detected with the aid of a sensor.

Thus, in a development the apparatus includes a detection unit which is coupled on the output side to an input of the control unit. The detection unit detects the position of the apparatus.

In a next development the detection unit is:
an acceleration sensor, in particular a capacitively operating acceleration sensor and/or a sensor fabricated on a silicon basis in integrated technology. The sensor is consequently very sensitive and very small.
at least one switching contact, disposed for example on the base of the apparatus, such that the position upright is detected.
at least one photoelectric relay with the aid of which the presence or absence of a contact surface is detected.
a sensor unit having a movably mounted liquid or at least one movably mounted solid body. Examples of sensors of said kind are mercury sensors or sensors which contain one or more metal bodies or pellets.

A single-axis sensor, a dual-axis sensor or a triple-axis position sensor can be preferably be used as the position sensor. With multi-axis position sensors the positions that are possibly not required may be used for example for other application purposes. Thus, for example, a position sensor supplies at two outputs or at three outputs in each case a voltage level or a mark/space-modulated or pulse-width-modulated output signal matching the acceleration value into the relevant axis, which output signal is output via a port or an analog/digital converter. In order to save on ports or analog/digital converters, in one embodiment the two or three signals are also multiplexed unit onto just one output signal with the aid of a multiplexer. The read-out values of the position sensor are preferably averaged such that minor movements of the device do not lead to the switching over of the parameter sets for different positions.

In another development the apparatus includes an acoustic-electric converter unit which is situated at the start of the receive transmission branch. An electret microphone, for example, is used as the microphone. In addition the apparatus preferably also includes an electro-acoustic converter unit which is disposed at the end of a second transmission branch of the apparatus. The electro-acoustic converter unit is a loudspeaker for example.

In a next development the control unit controls the attenuation as a function of the position and independently of the frequency of the signals. In this context reference is also made to a conventional deviation control unit.

In an alternative development, by contrast, the control unit controls the attenuation as a function of the position and as a function of the frequency of the signals. It is sensed, for example, which frequencies are present in the current receive signal that is output by the loudspeaker. The frequencies present in the receive signal are suppressed or very strongly attenuated in the case of a transmit signal. A feedback can be avoided by this measure. Furthermore the speaking subscriber at the distant station hardly notices while speaking that certain frequencies are missing in the backward-transmitted voice signal. What is referred to as a comb filter unit is preferably used for this attenuation.

The control unit specifies for example filter coefficients for filter units in the transmission branch in order to achieve a frequency-selective attenuation. Alternatively, different filter units with filter coefficients that are different from one another are switched between.

In another development, the apparatus contains a memory unit in which a data record or at least two data records each containing at least one item of data is or are stored. The data record or one of the data records is selected by the control unit as a function of the preferably detected position for the purpose of processing the voice data. For example, a data record contains predefined attenuation values or attenuation factors, filter coefficients, or other data which specify the above-explained influencing possibilities. Alternatively, subcircuits corresponding to the data records can also be selected.

In a next development, the apparatus contains a determination unit which determines and stores at least one data record as a function of the preferably detected position. By this measure influences of the further environment or of the underlying surface can be taken into account even more effectively. Thus, it can be provided that different parameter sets are determined only at the user of the apparatus by an adjustment by measured signals, e.g. with the aid of the sampling of a frequency range from 200 to 3400 hertz, in the different positions. For example the necessary residual deviation is determined or frequency response corrections are determined. Alternatively the coupling is reduced for critical frequencies.

In a variant without determination unit, however, predefined parameters are used and transferred according to the detected position. This is advantageous in particular in order not to place an excessive load on a processor of the apparatus.

According to a second aspect, the inventors propose an apparatus which contains a control unit and a detection unit for detecting the position of the apparatus. The control unit switches the apparatus or a subunit of the apparatus off or into a power-saving mode, dependent on a signal coming from the detection unit. This apparatus is therefore closely related to the apparatus of the first aspect, in particular if a position sensor is also used for this. In particular both functions can also be implemented in a single apparatus.

The second aspect is based inter alia on the consideration that the lighting of an apparatus should be activated as soon as the apparatus is moved or, for example, as soon as the device is placed in an upright position. In the rest position a color display, for instance, is switched off for power-saving reasons. Displayed content can consequently no longer be read until a key is pressed. For example, a time of day could be displayed on the display. However, the lighting of the display or the display itself cannot be switched off completely; instead it is merely switched into a power-saving mode in which a certain readability is still present. Of course, this power-saving mode also costs power, in particular also at times when the device is lying on the display and the lighting or more specifically the display cannot even be required in this case.

If the lighting of the display or the display itself is switched off or switched to a darker level for power-saving reasons, a movement of the device should cause the lighting or the display itself to be activated. Ideally, however, the lighting or the display itself should even be switched off completely if the device is lying on the keypad or the display. For this purpose the output signals of the position or acceleration sensor, for example, are read out and checked for a change. If a change that exceeds a predefined value is detected, the evaluating processor, for example, switches the lighting or the display to active. If this function is to be used on its own, a single-axis position sensor or a dual-axis position sensor is also sufficient. Compared to the first aspect, therefore, a comparatively brief averaging of the output signals of the position sensor is performed.

A development of another aspect relates to an apparatus which likewise contains a control unit and a detection unit for detecting the position of the apparatus. On the output side the detection unit is coupled to the input of the control unit. In addition the apparatus includes a signaling unit which signals an incoming call arriving at the apparatus. The control unit initiates acceptance of the call as a function of an output signal of the detection unit. This third aspect also is closely related to the other two aspects and can be implemented in particular together with the latter in one apparatus.

The third aspect proceeds from the consideration that when an incoming call occurs a line or a radio channel is to be seized by the device being picked up. This function should be independent of the initial position of the device.

In the call mode of the device, therefore, a movement of the device should lead to the acceptance of the call such that a key does not have to be actuated first. For this purpose, however, the output signals of the position sensor should only be averaged correspondingly briefly so that the change in acceleration or the change in position can be quickly evaluated. Accordingly a method could be used similarly to the detecting of a movement for the purpose of switching on a display unit, for example. Needless to say, the response "seize" may only be initiated when a call is also actually present, i.e. when the apparatus is called. The evaluation therefore takes place only within a specific time window from the time the call is received, in order to avoid incorrect seizures. For example the end of the time window occurs e.g. a maximum of 2 seconds after the last ringing signal. If this function is used on its own, a dual-axis position sensor or even only a single-axis position sensor is sufficient.

The sensor units cited for the first aspect can also be used for the apparatuses according to the second and third aspects.

To sum up, for the first aspect it holds that high-end terminal devices in particular benefit from an increase in handsfree quality, since only that decoupling is inserted that is absolutely necessary. Thus, the duplex communication is less strongly attenuated in favorable positions than previously. In conjunction with an acoustic echo canceller or echo compensator a true full-duplex handsfree connection could be implemented in which both parties to a call can speak as peer entities on a totally equal basis without having to sacrifice good volume.

With regard to the second aspect, a considerable gain in convenience results from the fact that the display is instantly readable. In the case of an already "powersave"-illuminated display, power can be saved in particular when the device is lying on the display side and consequently the lighting is not required. The power consumption of the position sensor in this case is far below the power consumption of the lighting for a display.

A considerable gain in convenience is likewise achieved with regard to the third aspect.

The gain in convenience is particularly great when all three aspects are used in a terminal device.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

Figure 1:
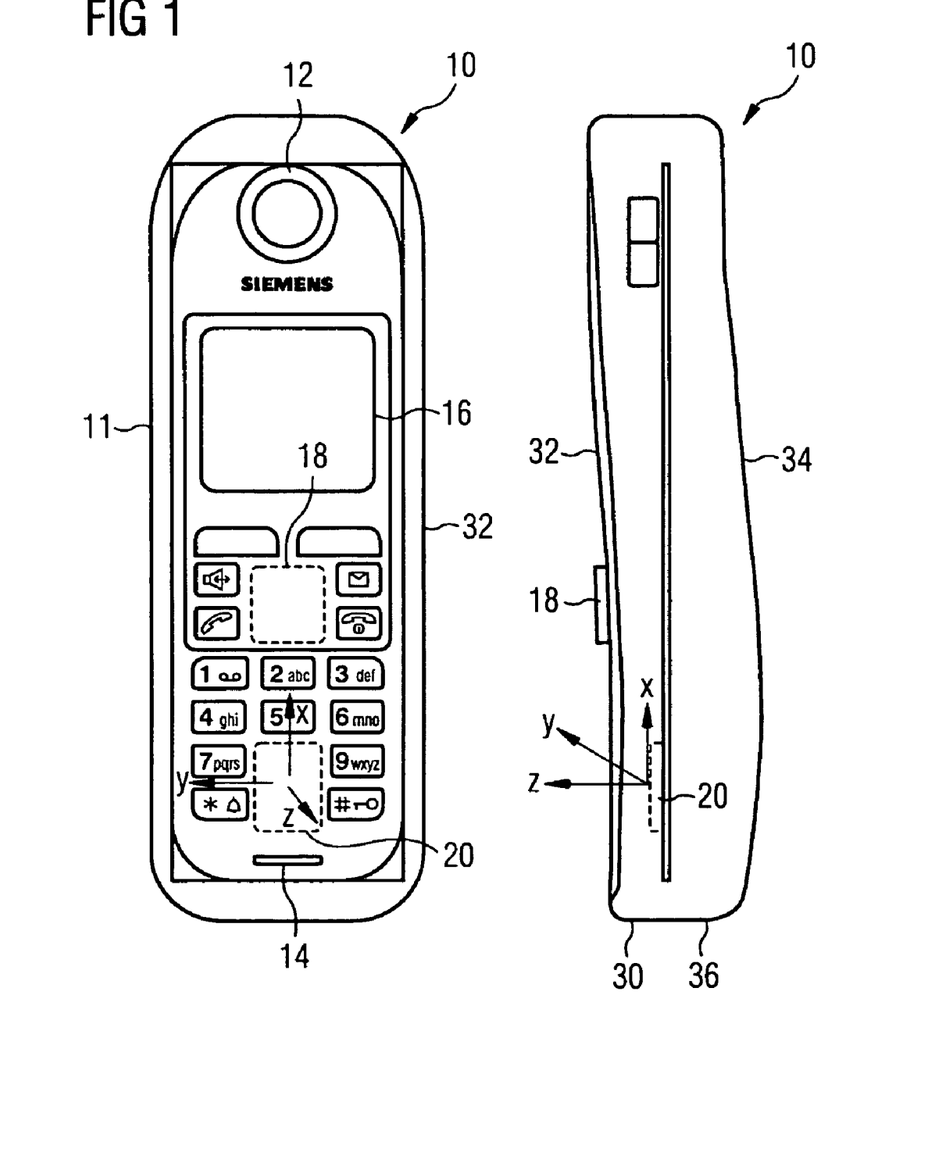
FIG. 1 shows a DECT telephone (digital Enhanced (formerly: European) Cordless Telephone)

FIG. 1 shows a DECT telephone 10. In another exemplary embodiment a mobile radio telephone is used instead of the telephone 10, in particular a telephone of a GSM network (formerly: Groupe Spéciale Mobile; Global System for Mobile Communication) or of a UMTS network (Universal Mobile Telecommunication System), or of a further-developed UMTS network.

The mobile telephone 10 is provided with a housing 11. Located in the housing 11 is for example an earpiece aperture 12 behind which is arranged an earpiece. Located at the back 34 of the housing 10 is, for example, a loudspeaker aperture behind which is arranged a loudspeaker 72; see FIG. 2. In the lower section of the front 32, the housing 11 also includes a microphone aperture 14 behind which is arranged a microphone 78; see FIG. 2.

The housing 11 also includes an aperture for a display 16, in particular for a color display. A control function with reference to the display 16 is explained in more detail below with reference to FIG. 9. Also arranged on the front 32 of the telephone 10 are a plurality of keys; see key 18, for example.

Whereas the left side of FIG. 1 shows a plan view onto the front 32 of the telephone 10, the right side of FIG. 1 shows a side view of the telephone 10. Internally the telephone 10 contains a printed circuit board 30 on which is disposed a position sensor 20, in the exemplary embodiment a triple-axis position sensor 20, for an x-direction, a y-direction and a z-direction. The x-direction and the y-direction lie e.g. parallel to a topside of the printed circuit board 30. The z-direction lies e.g. in the normal direction of the topside of the printed circuit board 30.

Also shown on the right-hand side of FIG. 1 are a back 34 and a base 36 of the telephone 10.

The position sensor 20 is for example a dual-axis position sensor ADXL 320 from the company Analog Devices. In addition to the sensor element, this sensor or another position sensor includes in particular an a.c. voltage amplifier, a demodulator and for example two output amplifiers. The two-axis position sensor detects, for example, in the x-direction and z-direction or alternatively in the y-direction and z-direction.

In another exemplary embodiment a position sensor of the HAAM-301A or 302B type from the company HOKURIKU, for example, or a similarly designed position sensor is used. These sensors include for example a multiplexer, an amplifier and a demultiplexer. The type 301A in particular contains a pulse width controller.

In other exemplary embodiments a three-axis position sensor comprising three analog/digital converters is used. In an alternative exemplary embodiment a three-axis position sensor comprising a multiplexer and only one analog/digital converter is used. In a third variant a three-axis position sensor having three outputs at which pulse-width-modulated or mark/space-modulated signals are output which are routed directly to inputs of a processor. In this case the processor, by scanning the ports, evaluates the length of the high/low phases in order to obtain a value that is proportional to the mark/space ratio.

Figure 2:
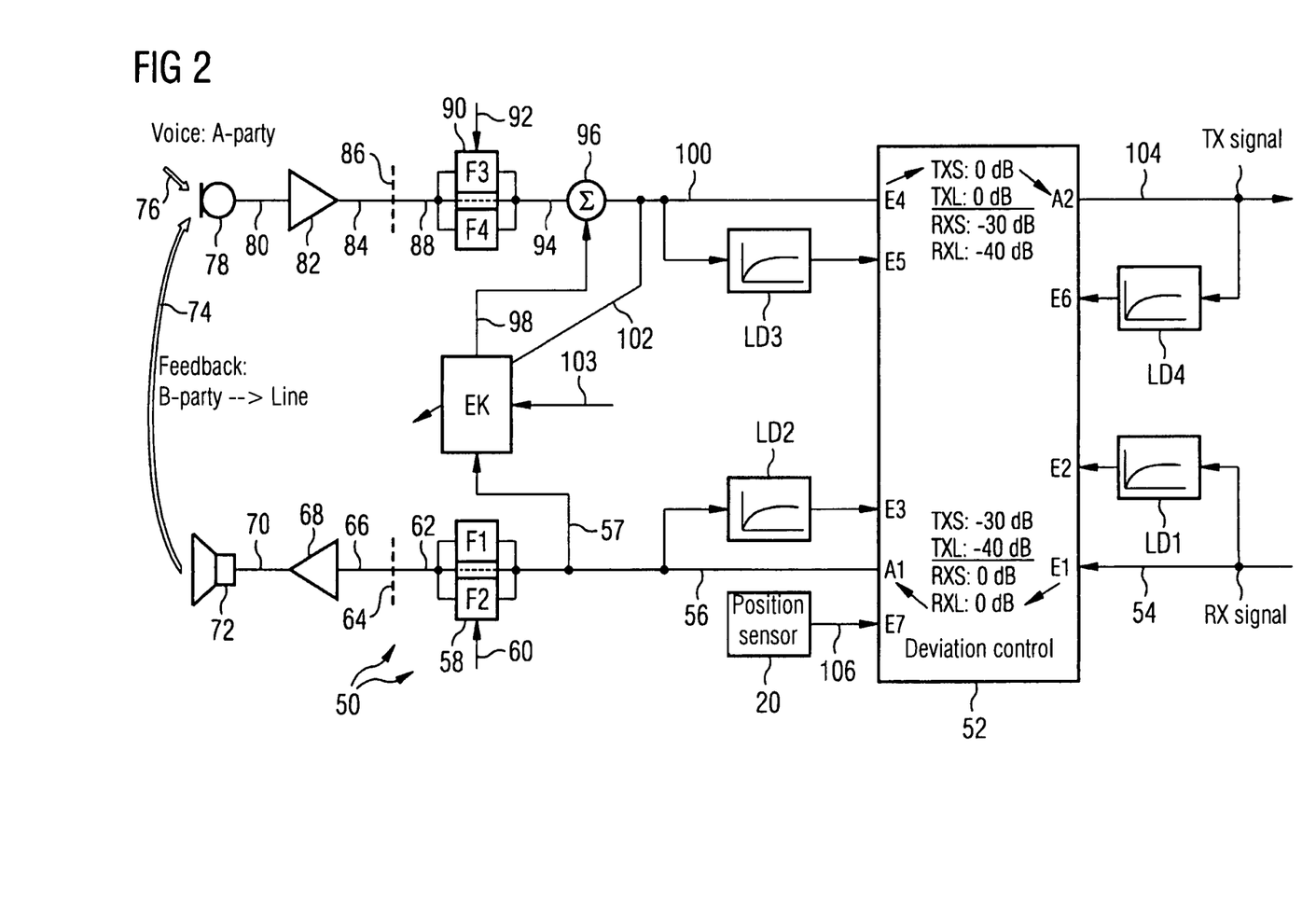
FIG. 2 shows a voice module of the telephone.

FIG. 2 shows a voice module 50 of the telephone 10. The voice module 50 is implemented with the aid of components that operate in analog fashion and with the aid of a component that operates digitally, e.g. a digital signal processor (DSP) or a different processor. The voice module 50 contains a deviation control unit 52 whose functions are performed by the processor in the exemplary embodiment. Alternatively, however, the voice module 50 can also be implemented without a processor, i.e. only by an electronic circuit in which no program instructions are stored and executed.

A receive signal 54 arrives at an input E1 of the deviation control unit. The receive signal 54 is represented for example by a sequence of sampled values, by 16-bit sampled values for example. The receive signal 54 originates, for example, from a radio-frequency section (not shown) of the telephone 10. The signal was sent to the radio-frequency section by, for example, what is referred to as a base station from which e.g. a plurality of telephones 10 are operated, with data being transmitted to the telephones 10 e.g. in accordance with the DECT standard.

The receive signal 54 is also applied to an input of a level detector unit LD1. The level detector unit LD1 outputs an output signal for an input E2 of the deviation control unit 52. The deviation control unit 52 implements for example the functions of what is referred to as a duplex controller, the functions of which are known per se. In particular the deviation control unit 52 switches between two operating modes TX and RX, depending e.g. on the strength of the receive signal 54 and the strength of the transmit signal 104 of the voice module 50. In the exemplary embodiment the transmit signal 104 is stronger than the receive signal 54 in the operating mode TX. In the operating mode RX, on the other hand, the receive signal 54 is stronger than the transmit signal 104. This evaluation is performed by a decision unit inside the deviation control unit 52 which is controlled by the level detectors LD1 to LD4.

The deviation control unit 52 outputs an intermediate signal 56 generated from the input signal 54, in particular a digital signal, at an output A1. The intermediate signal 56 is routed to the input of a level detector unit LD2. The output of the level detector unit LD2 is connected to an input E3 of the deviation control unit 52.

The intermediate signal 56 is routed as an input signal 57 to an echo canceller unit EK, the function of which will be explained in more detail below. In addition the intermediate signal 56 is routed to a filter switchover unit 58 which has, for example, three operating modes which are assumed as a function of a switchover signal 60. For example, a filter operating mode with a filter unit F1, a filter operating mode with a filter unit F2 and an operating mode in which the input signal is output unchanged as the output signal. The filter units F1 and F2 are embodied for example as digital filter units with different coefficients.

A filter output signal 62 is output at the output of the switchover unit 58. At a digital/analog interface 64 the filter output signal 62 is converted into an analog signal which is routed on a line 66 to an output amplifier 68. The digital/analog interface includes in particular a digital/analog converter.

The output amplifier 68 performs an output amplification and at its output outputs an amplified signal on a loudspeaker line 70. The loudspeaker line 70 leads to the loudspeaker 72.

At the loudspeaker 72 the voice signal received by the voice module 50 is output very audibly in handsfree mode. Operating the voice module 50 in a handsfree mode results in a feedback 74 of the voice signal output at the loudspeaker 72 to the microphone 78.

In the exemplary embodiment the subscriber using the telephone 10 or the voice module 50 is a subscriber who has set up the call, i.e. what is referred to as a calling subscriber or A-party. The subscriber at the distant station is a B-party. However, all the explained methods also work when the telephone 10 is used by a B-party, i.e. by a called subscriber.

In the exemplary embodiment voice 76 of the A-party also reaches the microphone 78. From the microphone 78, a microphone line 80 leads to the input of an input amplifier 82. At its output the input amplifier 82 generates an analog amplified signal on a line 84. The line 84 leads to an analog/digital converter or to what is referred to as an encoder. These units form an analog/digital interface 86 behind which, viewed in the signal flow direction, digital data is processed, said digital data representing a microphone signal 88.

The microphone signal 88 is input into a filter switchover unit 90 which, dependent on a switchover signal 92, has, for example, three operating modes:

a filter operating mode with a filter unit F3, a filter operating mode with a filter unit F4 which has a different frequency response from the filter unit F3, and a "transit" operating mode in which the microphone signal 88 is output unchanged at an output of the filter switchover unit 90. A filter output signal 94 is output at the output of the filter switchover unit 90.

The filter output signal 94 is added to an output signal 98 generated by the echo canceller unit EK at a summing unit 96. An aggregate signal 100 is produced at the output of the summing unit 96. The aggregate signal 100 also serves as a further input signal 102 of the echo canceller unit. The echo canceller unit EK initially operates in a known manner and serves to remove signal components which are still included in the filter output signal 94 as a result of the feedback 74.

The echo canceller unit EK has a further input at which a control signal 103 is present. Said control signal 103 is dependent on the position of the telephone 10; for example, what is referred to as an echo loss level, i.e. a measure for the acoustic coupling of the acoustic path 74, is input here dependent on the position that is detected by the position sensor 20.

The aggregate signal 100 reaches an input E4 of the deviation control unit 52. The aggregate signal 100 is also routed to an input of a level detector unit LD3. The output of the level detector unit LD3 leads to an input E5 of the deviation control unit 52.

The deviation control unit 52 attenuates the aggregate signal 100 as a function of the current operating mode TX or RX and as a function of the position 20 detected by the position sensor. The attenuated signal is output at an output A2 of the deviation control unit 52 as a transmit signal 104, which then reaches the HF unit and is sent via a radio communications link to the base station.

The base station transmits the voice data to a network conforming, for example, to ISDN, to an analog method, to a VoIP (Voice over Internet Protocol) method or to a WLAN (Wireless Local Area Network) method.

The transmit signal 104 is also routed to a fourth level detector unit LD4 whose output signal is routed to an input E6 of the deviation control unit 52.

In the example the deviation control unit 52, in order to detect the operating mode TX or RX, operates with what is referred to as a four-point query. In other exemplary embodiments only a two-point query is used, for example with the aid of the level detector units LD1, LD4 or alternatively with the acoustic-side level detectors LD2, LD3.

In addition a line 106 leads from the position sensor 20 to an input E7 of the deviation control unit 52. This enables the deviation control unit 52 to detect in which position the telephone 10 is currently to be found, in a vertical position, for example, or in a horizontal position. The vertical position is referred to hereinafter as "upright" and is indicated by the letter "S". The horizontal position is referred to hereinafter as the "horizontal" position, and is indicated by the letter "L".

In the operating mode TX, i.e. the transmit signal 104 of the module 50 is stronger than the receive signal 54, the receive signal 54 is more strongly attenuated in the horizontal position L than in the upright position S. In the exemplary embodiment the following applies:

TXS=−30 dB (decibels), and

TXL=−40 dB.

The reason why a greater attenuation is necessary in the horizontal position of the telephone 10 in the exemplary embodiment is explained in more detail below with reference to FIGS. 3 to 5.

In the operating mode TX the aggregate signal 100 is not attenuated by the deviation control unit 52, i.e. either in the upright position TXS=0 dB or in the horizontal position TXL=0 dB.

In the operating mode RX, in which the receive signal 54 is much stronger than the transmit signal 104, the receive signal 54 is not attenuated regardless of the current position of the telephone 10, i.e. with 0 dB. However, the aggregate signal 100 is very strongly attenuated in the operating mode RX, and what's more as a function of the position detected with the aid of the position sensor 20, as follows:

in the upright position RXS an attenuation of −30 dB is used.

In the horizontal position RXL an even stronger attenuation of −40 dB is used.

The attenuation values just cited are merely examples and apply in particular to the situation in which no echo canceller unit EK is used. If the echo canceller unit EK is used, an attenuation of at least 20 dB can be achieved by said unit alone. In this case the above-cited attenuation values should be increased by at least 20 dB. This means, for example, that the attenuation TXS must now only amount to −10 dB.

In addition or alternatively to the above-explained deviation control unit 52 with position-dependent control and/or in addition to the echo canceller unit EK with position-dependent control, the frequency responses can also be controlled on a position-dependent basis; see control signals 60, 92. The influencing of the frequency responses by the filter units F1 to F4 is explained in more detail below with reference to FIGS. 6 to 8 for the upright position of the telephone 10.

In other exemplary embodiments with influencing of the frequency responses the filter units F1 to F4 can also be disposed at a different point in the voice module 50, for example as circuit elements upstream or downstream of the output amplifier 68 or the input amplifier 82.

Figure 3:
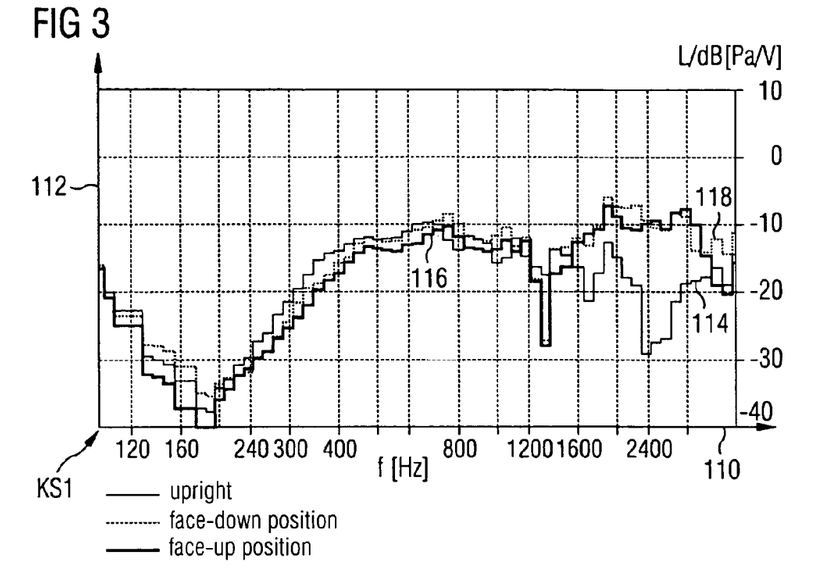
FIGS. 3 to 5 show frequency curves as examples of a deviation requiring to be saved, as a function of the position of the telephone.

FIG. 3 shows in a coordinate system KS1 three frequency curves 114, 116 and 118 for three positions of the telephone 10. In this case the frequency curves 114, 116 and 118 were recorded by way of sound signals output by the loudspeaker 72, when passing through a spectrum from 200 hertz to 4 kilohertz, for example by a swept sinusoidal signal.

The coordinate system KS1 has an x-axis 110 on which the frequencies are represented logarithmically in the frequency range from 200 hertz to approx. 4 kilohertz. The acoustic level is represented on a y-axis 112, in particular in a range from 0 dB (Pascal/Volt) to −40 dB.

The curve 114 relates to an upright telephone 10. The curve 116 relates to a telephone 10 lying on its back 34. The curve 118 relates to a telephone 10 lying on its front.

It can be seen from the curves 114 to 118 that in the case of the telephone 10 the loudspeaker levels are considerably different from one another at frequencies of approx. 1.4 kilohertz to 3.5 kilohertz dependent on the position of the telephone 10. Apart from the sound at the A-party end, the acoustic coupling also changes as a result hereof at these frequencies.

It is common to all three curves 114 to 118 that they rise approximately linearly from approx. 200 hertz. In the range von 500 hertz to approx. 1.2 kilohertz the curves 114 to 118 remain roughly at a constant acoustic level of approx. −15 dB. From a frequency of 1.2 kilohertz the curves 114 to 118 deviate more sharply from one another, the curve 116 and the curve 118 rising somewhat and exhibiting comparatively little fluctuation. By contrast the curve 114 drops in the frequency range from approx. 2 kilohertz to 3 kilohertz significantly below the value of the curves 116 and 118 in this range.

Figure 4:
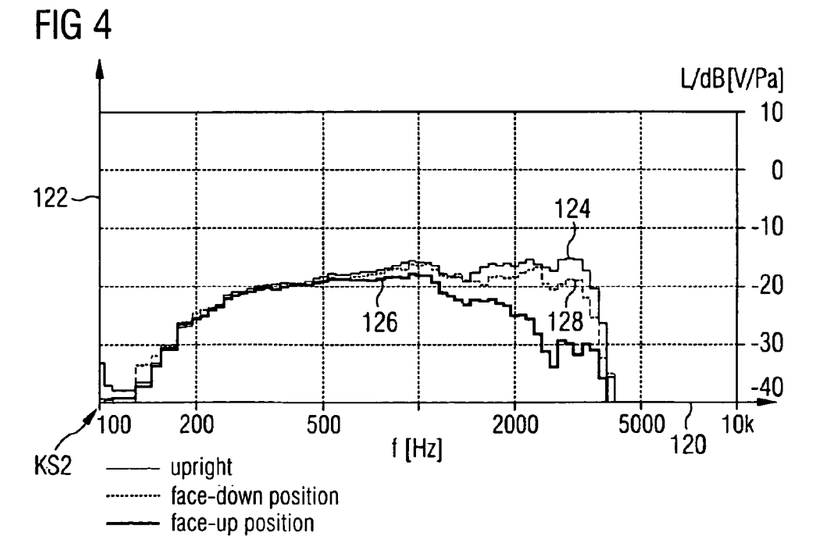

FIG. 4 shows in a coordinate system KS2 three curves 124, 126 and 128 for a frequency range from 200 hertz to approx. 4 kilohertz, the transmit frequency spectrum having been investigated this time. Using, for example, a sine-wave generator, the frequency band from 200 hertz to 4 kilohertz was swept through, sound signals having been directed to the microphone 78 in the three aforementioned different positions of the telephone. The curve shapes 124, 126 and 128 shown in FIG. 4 were measured for example upstream of the input amplifier 82 or downstream of the input amplifier 82.

The coordinate system KS2 has an x-axis 120 on which the frequency in hertz is represented logarithmically in the range from 200 hertz to 4 kilohertz. The levels recorded by the microphone 78, in particular in the range from 0 dB to −40 dB, are represented on a y-axis 122.

In the coordinate system KS2 also, it can be seen that the levels recorded by the microphone 78 are considerably different from one another at frequencies from 1 kilohertz to 4 kilohertz, dependent on the position of the telephone 10. Thus, apart from the sound at the B-party end, this also causes a change in the acoustic couplings at these frequencies.

Specifically it holds that the curves 124 to 128 rise in the frequency range from 200 hertz to approx. 600 hertz from levels of −40 dB to levels of approx. −18 dB.

The following applies for the frequency range from 600 hertz to 3.5 kilohertz:

the curve 124 for an upright telephone 10 remains at a roughly constant value of −18 dB and shows an abrupt drop only at a frequency of 3.5 kilohertz.

The curve 126 applies to the telephone 10 when it is lying on its back 34. The curve 126 drops roughly linearly in the range from 600 hertz to 3.5 kilohertz in the chosen representation.

The curve 128 applies to a telephone 10 that is lying on its front 32. The curve 128 remains roughly in the range of −20 dB in the frequency range from 600 hertz to 3.5 kilohertz and then drops abruptly to values of −40 dB at 3.5 kilohertz.

Figure 5:
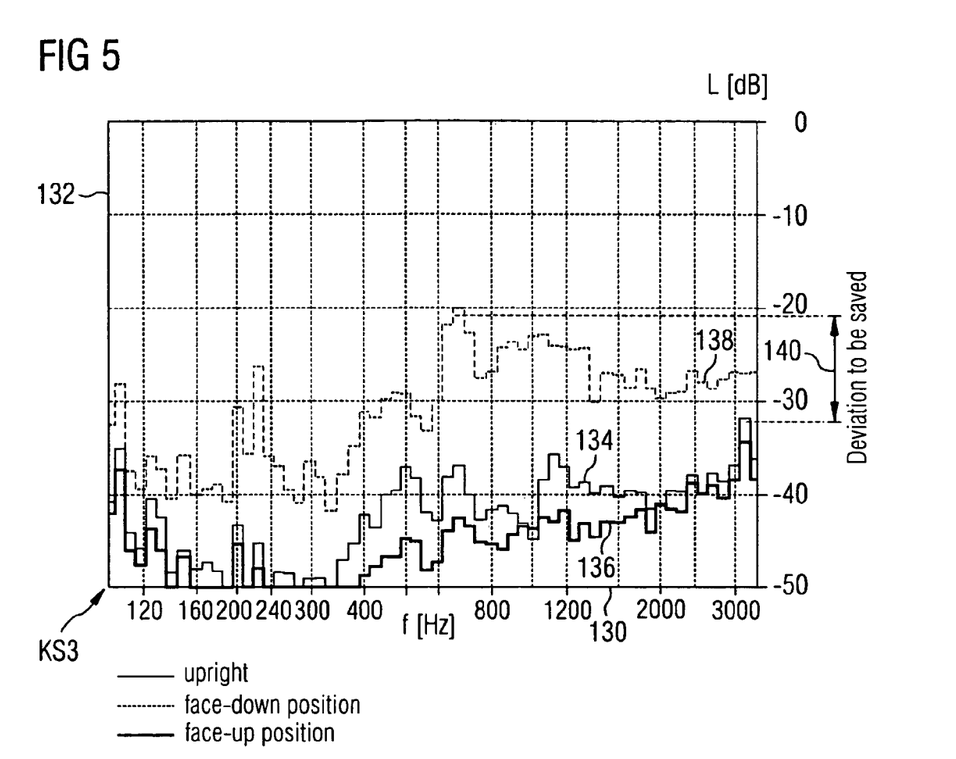

FIG. 5 shows in a coordinate system KS3 the overall coupling losses resulting in the case of an addition of the curves shown in FIG. 3 or 4 for the respective position of the telephone 10:

a curve 134 for an upright telephone 10,
a curve 136 for the telephone 10 that is lying on its back 34, and
a curve 138 which applies to the telephone 10 when it is lying on its front 32.

The coordinate system KS3 has an x-axis 130 in which frequencies of 100 hertz to approx. 4 kilohertz are plotted in logarithmic representation. The decoupling in dB is represented on a y-axis 132 in the range from 0 dB to −50 dB against the y-axis.

In this case the aggregate curve 138 reaches the highest values or the smallest attenuation values. This means that the highest coupling arises here and consequently must be decoupled by a correspondingly high additional attenuation. In the exemplary embodiment the maximum of the curve 138 lies at approx. −20 dB.

For the situation in which the telephone 10 is standing upright, i.e. for the curve 134, its maximum value lies at approx. −30 dB only. This means that in this case considerably less additional attenuation is required.

The deviation of the curves 134, 138 results in a deviation 140 to be saved of approx. 10 dB, which has been taken into account above with reference to FIG. 2 in the different operating modes TX and RX of the deviation control unit 52.

The curve 136 lies even below the curve 134, so that in this regard what was said about the curve 134 applies similarly here.

Figure 6:
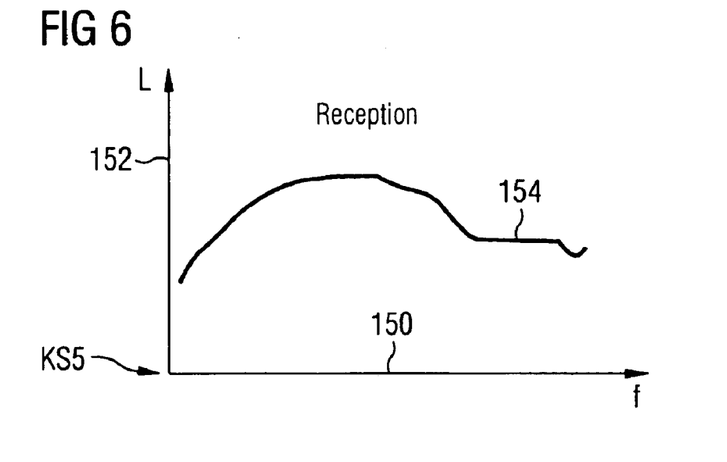
FIGS. 6 to 8 show frequency curves as examples of a frequency response correction, as a function of the position of the telephone.

FIG. 6 shows a coordinate system KS5 having an x-axis 150 on which the frequency f for the relevant frequency range of e.g. 200 hertz to 4 kilohertz is plotted, in logarithmic representation for example. The acoustic level in dB is plotted on a y-axis 152, once again in logarithmic representation for example.

A curve 154 applies for the reception in the voice module 50, i.e. during the output of sound signals by the loudspeaker 72. The curve 154 corresponds to the curve shape 114 which has already been explained with reference to FIG. 3. This means in particular that the curve shape 154 applies to a telephone 10 that is upright. As can be seen from FIG. 6, frequencies in the upper frequency range, from approx. 2 kilohertz to 3.5 kilohertz, are more strongly attenuated than frequencies in the frequency range from 300 hertz to 2 kilohertz. This means that speech is output at a more muted level by the loudspeaker 72 compared to the speech spoken by the B-party.

Figure 7:
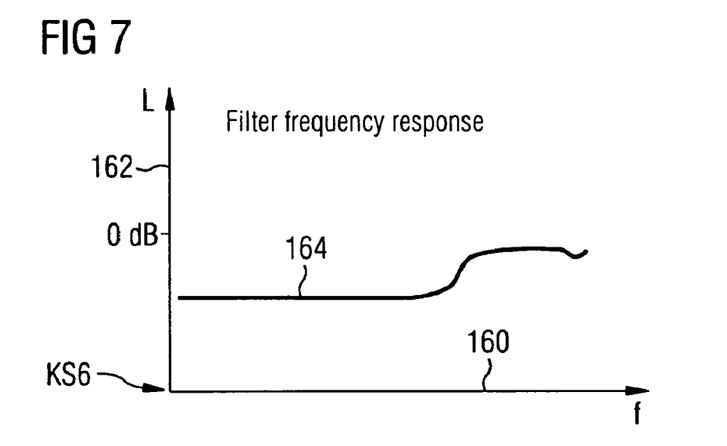

In order to correct this, the filter unit F1 for example (see FIG. 2) is used with the frequency response curve 164 shown in FIG. 7 when the telephone 10 is upright.

FIG. 7 shows in a coordinate system KS6 a filter frequency response 164 which corresponds to that of a high-pass filter, with frequencies in the frequency range from 200 hertz to 2000 hertz being more strongly attenuated than frequencies in the range from 2 kilohertz to 4 kilohertz. The coordinate system KS6 has an x-axis 160 on which the frequency f is once again represented in logarithmic scale. The attenuation value in dB is represented on a y-axis 162, with the value 0 dB being highlighted.

Figure 8:
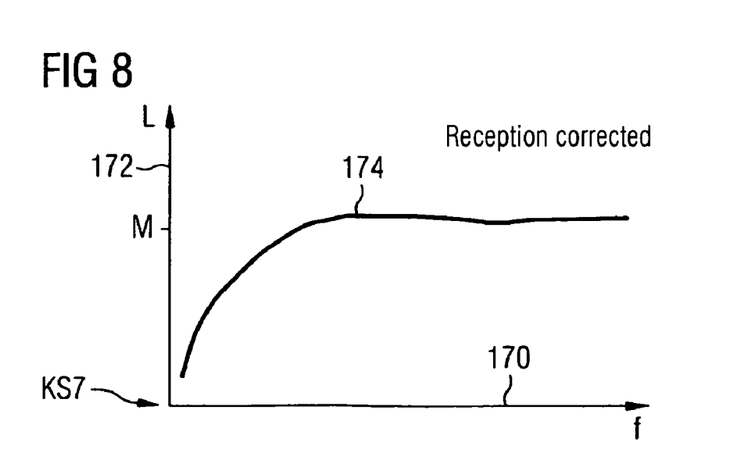

FIG. 8 shows in a coordinate system KS7 a frequency response 174 which results from the overlaying or addition of the curve 154 and the curve 164. The coordinate system KS7 has an x-axis 170 on which the frequency f is represented in logarithmic scale. The acoustic level L is likewise represented in logarithmic scale on a y-axis 172. As can be seen from FIG.

8, the curve 174 rises continuously to a value M, at approx. 600 hertz for example. Then the curve 174 remains roughly constant on the value M up to 4 kilohertz.

Thus, what is achieved is that the B-party no longer sounds muted, but sounds as he/she usually speaks.

Similar corrections in respect of the receive branch can be performed by the filter unit F2 for a telephone 10 that is lying horizontal.

Frequency response corrections can also be performed in respect of the transmit branch for an upright telephone 10 with the aid of the filter unit F3 as well as for a horizontal telephone, in which case the filter unit F4 is then used.

Figure 9:
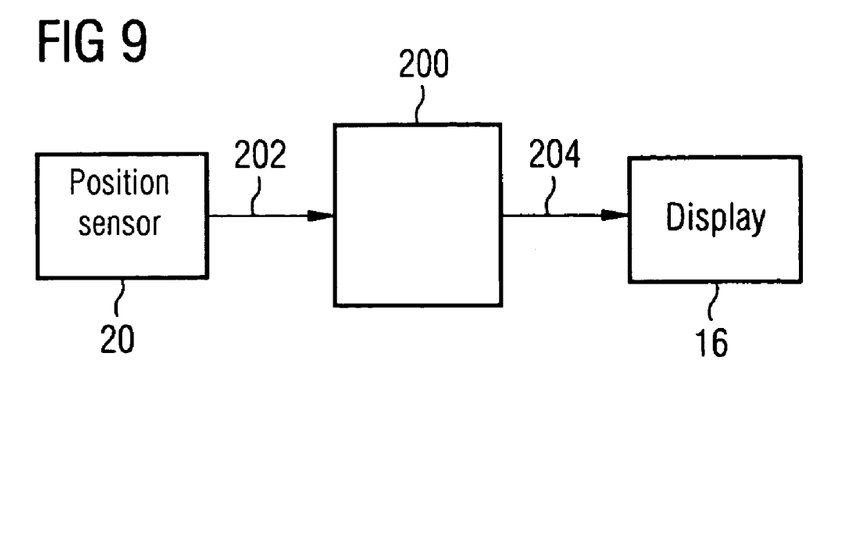
FIG. 9 shows a further exemplary embodiment having a position-dependent display controller.

FIG. 9 shows in a further example a position-dependent display controller. As depicted in FIG. 9, a control unit 200, e.g. with processor or without processor, evaluates an output signal 202 of the position sensor 20. If the control unit 200 establishes that the display 16 is facing downward, the display 16 is switched off or alternatively is switched into a power-saving mode. If the control unit 200 detects with the aid of the position sensor 20 that the telephone 10 is upright again or has been turned over so that the display 16 is visible, the display 16 is activated; see arrow 204, i.e. the display 16 is switched back on again or switched into the power-saving mode (standby). Instead of the display 16 a backlight can also be controlled accordingly.

In the standby mode the display 16 still consumes, for example, 3 to 10 milliamperes. When the display 16 or the display lighting is fully activated, on the other hand, 6 to 20 milliamperes are required.

Figure 10:
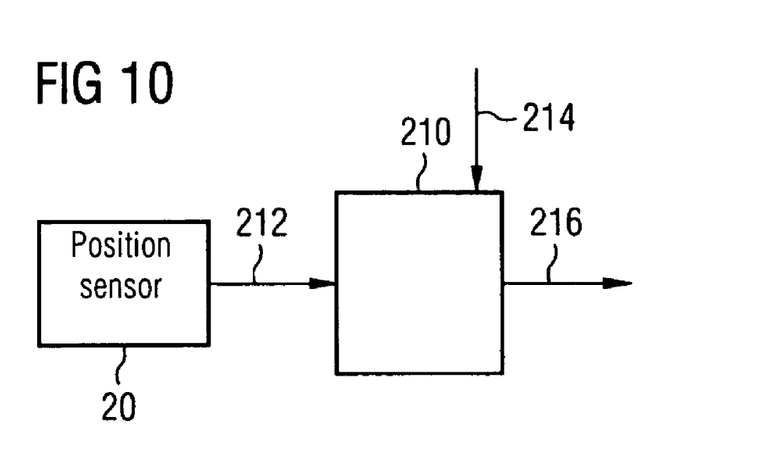
FIG. 10 shows a third exemplary embodiment having position-dependent call acceptance.

FIG. 10 shows a third exemplary embodiment having a position-dependent call acceptance controller. A control unit 210, for example with processor or else without processor, receives an input signal 212 from the position sensor 20. The control unit 210 also receives signaling notifying an incoming call; see arrow 214. The control unit 210 thereupon initiates the output of a ringing signal by way of the loudspeaker 72 or in some other way. The position sensor 20 is monitored at the same time. As soon as the position of the telephone 10 is changed beyond a threshold value, the control unit 210 automatically accepts the call. This action is symbolized by an arrow 216.

In another exemplary embodiment all three applications, i.e. FIGS. 1 to 8, as well as FIGS. 9 and/or 10, are implemented in one telephone 10.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2d 1865 (Fed. Cir. 2004).

The invention claimed is:

1. An apparatus for position-dependent control, comprising:
    a control unit, wherein dependent on the position of the apparatus the control unit:
    controls an attenuation or an echo cancellation of the apparatus, or
    switches a subunit of the apparatus on or off or into a power-saving mode, or
    initiates acceptance of a call, wherein
    the control unit controls the attenuation as a function of the position and as a function of a frequency of signals output to an input by a user of the apparatus,
    the control unit specifies a frequency range for signals output to the user or signals supplied to the apparatus from the user, and
    the control unit specifies filter coefficients of a filter unit in the transmission branch or selects one of a plurality of filter units which can be switched into the transmission branch.

2. An apparatus for position-dependent control, comprising:
    a control unit, wherein dependent on the position of the apparatus the control unit:
    controls an attenuation or an echo cancellation of the apparatus, or
    switches a subunit of the apparatus on or off or into a power-saving mode, or
    initiates acceptance of a call, wherein
    the apparatus further comprises a detection unit to detect the position of the apparatus, the detection unit having an output connected to an input of the control unit,
    the control unit switches at least a portion of the apparatus off as a function of the position detected by the detection unit,
    the detection unit includes an acceleration sensor,
    the control unit switches a display unit of the apparatus off to enter a power-saving mode,
    the detection unit detects if the display unit is facing in a direction of the earth's gravitational pull, and
    the display unit is automatically switched off by the control unit when the display unit faces the direction of the earth's gravitational pull.

* * * * *